(12) United States Patent
Seidel et al.

(10) Patent No.: US 9,976,882 B2
(45) Date of Patent: May 22, 2018

(54) METHOD OF FORMING AN ICE RESISTANT PITOT TUBE

(71) Applicant: Rosemount Aerospace Inc., Burnsville, MN (US)

(72) Inventors: Greg Seidel, Farmington, MN (US); Timothy Thomas Golly, Lakeville, MN (US); Paul Robert Johnson, Prior Lake, MN (US)

(73) Assignee: ROSEMOUNT AEROSPACE INC., Burnsville, MN (US)

( * ) Notice: Subject to any disclaimer, the term of this patent is extended or adjusted under 35 U.S.C. 154(b) by 235 days.

(21) Appl. No.: 14/922,659

(22) Filed: Oct. 26, 2015

(65) Prior Publication Data

US 2016/0054159 A1   Feb. 25, 2016

Related U.S. Application Data

(63) Continuation of application No. 14/065,878, filed on Oct. 29, 2013, now Pat. No. 9,207,253.

(60) Provisional application No. 61/720,643, filed on Oct. 31, 2012.

(51) Int. Cl.
*H01F 7/06* (2006.01)
*G01F 1/46* (2006.01)
*G01P 5/165* (2006.01)

(52) U.S. Cl.
CPC ............... *G01F 1/46* (2013.01); *G01P 5/165* (2013.01)

(58) Field of Classification Search
CPC .................................. G01F 1/46; G01P 5/165
See application file for complete search history.

(56) References Cited

U.S. PATENT DOCUMENTS

| | | | |
|---|---|---|---|
| 1,971,534 A | 8/1934 | Peace, Jr. |
| 2,254,155 A | 8/1941 | Reichel |
| 2,300,654 A | 11/1942 | Daiber |
| 2,482,701 A | 9/1949 | Anderson |
| 2,984,107 A | 5/1961 | Strieby et al. |
| 2,995,932 A | 8/1961 | Hardgrave, Jr. |
| 3,043,142 A | 7/1962 | Eiland, Jr. et al. |
| 3,267,992 A | 8/1966 | Werner et al. |
| 3,364,742 A | 1/1968 | De Leo |
| 3,383,916 A | 5/1968 | Werner |
| 3,392,585 A | 7/1968 | Bentz et al. |
| 3,415,120 A | 12/1968 | De Leo et al. |

(Continued)

FOREIGN PATENT DOCUMENTS

| | | |
|---|---|---|
| CN | 1052550 A | 6/1991 |
| CN | 1249037 A | 3/2000 |
| GB | 779754 A | 7/1957 |

OTHER PUBLICATIONS

Extended European Search Report for EP Application No. 13190036.7-1558, dated Dec. 20, 2013, pp. 1-8.

(Continued)

*Primary Examiner* — Paul D Kim
(74) *Attorney, Agent, or Firm* — Cantor Colburn LLP

(57) ABSTRACT

A method of forming a pitot tube includes forming a substantially cylindrical body portion including an outer surface, a tip portion having an inlet opening and an interior defining a flow passage, radially tapering the outer surface from the body portion toward the inlet opening, and disposing at least one electrical coil including one or more coil wraps along the flow passage of the pitot tube.

11 Claims, 2 Drawing Sheets

(56) References Cited

U.S. PATENT DOCUMENTS

| | | |
|---|---|---|
| 3,750,470 A | 8/1973 | Partzsch |
| 4,378,696 A * | 4/1983 | DeLeo ................... G01C 5/06 73/180 |
| 5,046,360 A | 9/1991 | Hedberg |
| 6,588,285 B1 | 7/2003 | Vozhdaev et al. |
| 9,207,253 B2 | 12/2015 | Seidel et al. |
| 2005/0011285 A1 | 1/2005 | Giterman |
| 2006/0178790 A1 | 8/2006 | Shigemi et al. |
| 2016/0041197 A1 | 2/2016 | Seidel et al. |

OTHER PUBLICATIONS

CN Office Action for Application No. 201310531205.8 dated Jun. 1, 2017 8 pages.

\* cited by examiner

METHOD OF FORMING AN ICE RESISTANT PITOT TUBE

CROSS-REFERENCE TO RELATED APPLICATIONS

This application is a continuation of U.S. application Ser. No. 14/065,878 filed Oct. 29, 2013, now U.S. Pat. No. 9,207,253, which claims priority to U.S. Provisional Application Ser. No. 61/720,643 filed Oct. 31, 2012, the disclosure of which is incorporated by reference herein in its entirety.

BACKGROUND

The subject matter disclosed herein generally relates to pitot tubes. More specifically, the present disclosure relates to ice prevention and removal from pitot tubes.

A pitot tube is widely used to determine airspeed of an aircraft or other vehicle, or to measure air or gas velocities in industrial applications. In particular, by measuring stagnation pressure of a fluid driven into the pitot tube, together with a measured static pressure, the airspeed of the aircraft can be determined. In certain flight conditions, the pitot tube may be subject to ice accumulation from moisture in the air. For this reason, pitot tubes are equipped with heating elements to prevent such ice accumulation. Further, in other conditions, the pitot tube may ingest ice crystals which then accumulate inside of the pitot tube and cause failure in its operation. A typical pitot tube is substantially cylindrical with an internal diameter containing the heating elements, or coils. Forward of the heating elements is a tip portion that extends radially from a throat diameter, typically smaller than the internal diameter, to an outer diameter of the pitot tube. The tip portion extends axially from the throat to a pitot tube inlet. The pitot tube inlet has a diameter greater than the throat. An exterior of the typical tube is cylindrical along its length to the inlet. Such a tube has a large surface area of material in the tip portion forward of the heater, and is difficult to heat and therefore to prevent ice accumulation thereon. Further, a large inlet diameter allows for proportionally more ice crystals to be ingested by the pitot tube. Such ingested ice crystals must be melted by the heating elements and drained from the pitot tube.

BRIEF DESCRIPTION

According to one aspect of an exemplary embodiment, a method of forming a pitot tube includes forming a substantially cylindrical body portion including an outer surface, a tip portion having an inlet opening and an interior defining a flow passage, radially tapering the outer surface from the body portion toward the inlet opening, and disposing at least one electrical coil including one or more coil wraps along the flow passage of the pitot tube. These and other advantages and features will become more apparent from the following description taken in conjunction with the drawings.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the disclosure, together with advantages and features, by way of example with reference to the drawings.

DETAILED DESCRIPTION

Figure 1:
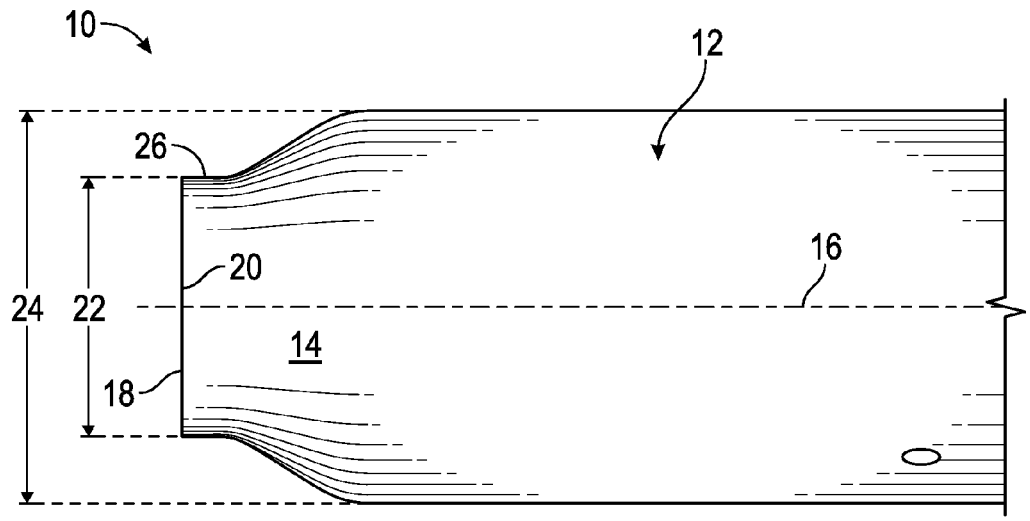
FIG. 1 is an illustration of an embodiment of a pitot tube.

Shown in FIG. 1 is a view of an embodiment of a pitot tube 10. The pitot tube 10 includes a cylindrical body portion 12 and a tip portion 14 extending along a tube axis 16 from the body portion 12 toward a tube inlet 18. In the embodiment of FIG. 1, the tip portion 14 includes an inlet opening 20 having an inlet diameter 22 smaller than a body diameter 24 of the body portion 12. The tip portion 14, between the body portion 12 and the inlet opening 20, tapers in diameter along a concave curve 26. In some embodiments, the concave curve 26 does not extend entirely to the inlet opening 20 as the inlet diameter 22 extends axially from the inlet opening 20 to the concave curve 26.

Figure 2:
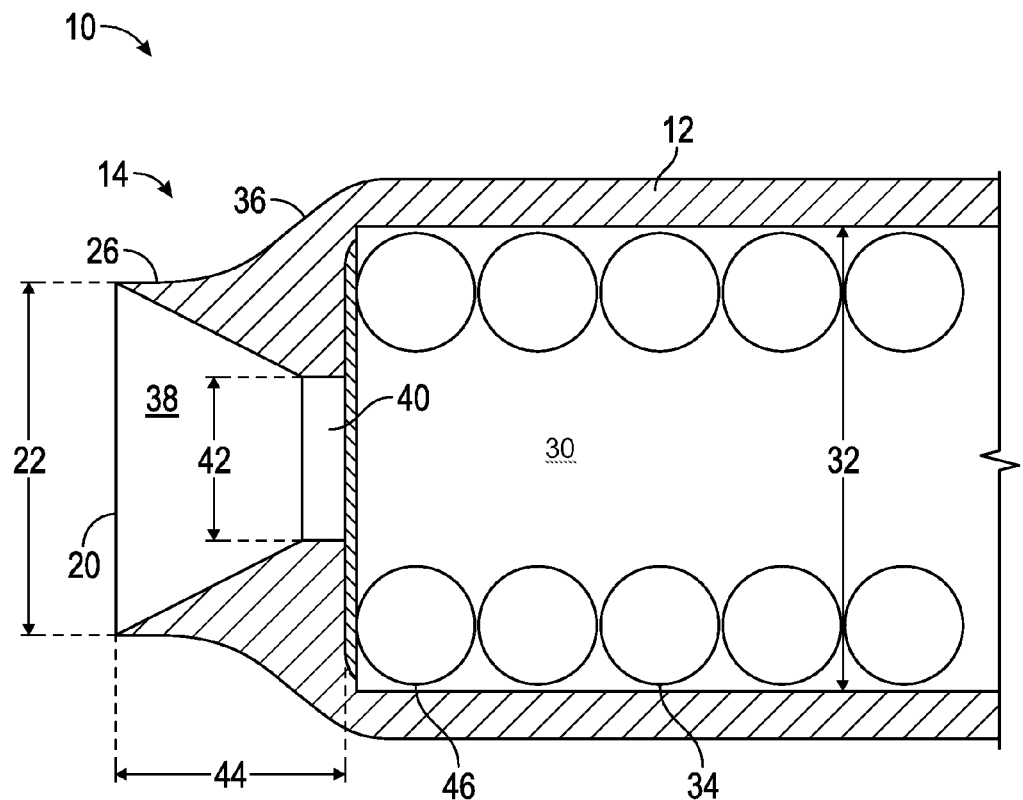
FIG. 2 is a cross-sectional view of an embodiment of a pitot tube.

Referring now to the cross-sectional view of FIG. 2, the pitot tube 10 has an interior 30 having an interior diameter 32. A heating element, or coil 34, is located in the interior 30. When an electrical current is applied to the coil 34, the pitot tube 10 is heated, thus melting accumulated ice, or preventing ice accumulation at an exterior 36, interior 38 of the tip portion 14, and interior 30. The tip portion 14 is separated from the interior 30 by a tube throat 40 having a throat diameter 42. The inlet diameter 22 and the throat diameter 42 are reduced, compared to prior art pitot tubes, to limit or reduce the particle size and/or number of particles, including ice crystals, ingested into the pitot tube 10 thereby reducing ice accumulation in the interior 30 of the pitot tube 10. In some embodiments, the inlet diameter 22 is between about 0.200 inches (0.508 centimeters) and about 0.300 inches (0.762 centimeters), while the throat diameter 42 is between about 0.100 inches (0.254 centimeters) and 0.200 inches (0.508 centimeters). The configuration of FIG. 2 increases the effectiveness of the coil 34 in heating the tip portion 14 by reducing a distance 44 between the coil 34 and the inlet opening 20, thereby reducing a temperature difference between the coil 34 and the inlet opening 20, an area of high convective activity. This, in turn, reduces demands on the coil allowing a coil size, or number of windings in the coil 34 to be reduced. Further, the concave curve 26 reduces a cross-sectional area of material in the tip portion 14. This, in turn, reduces demand on the coil 34, especially a forward-most one of the plurality of wraps 46 of the coil 34 through which heat is conducted into the tip portion 14.

Figure 3:
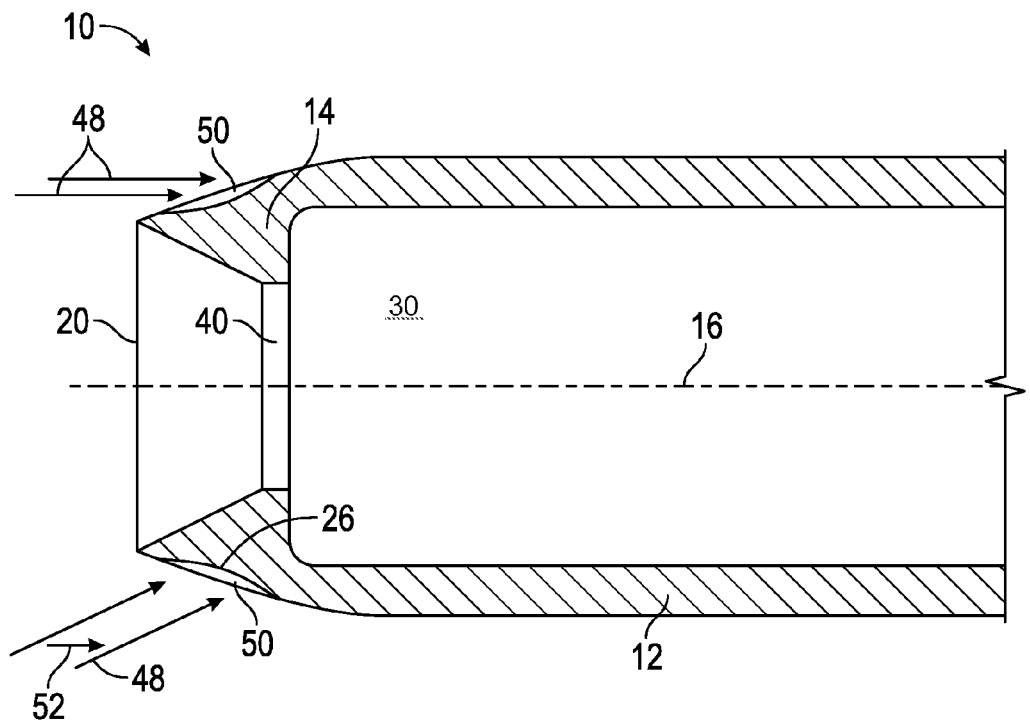
FIG. 3 is a comparison of an embodiment of a pitot tube with a previous pitot tube.

Referring now to FIG. 3, when particles 48, for example, liquid water or ice, impinge the pitot tube 10, they do so nearer to the coil 34 than in previous pitot tubes. As shown, particles 48 travelling substantially along the tube axis 16 travel further along the tube axis 16 past the inlet opening 20, when compared to a prior art tapered tube 50, before impinging on the pitot tube 10 due to the concave curve 26 of the tip portion 14. Particles 48 traveling at an angle 52 relative to the tube axis 16 impinge the tip portion 14 at a location radially inboard, when compared to a prior art tapered tube 50, due again to the concave curve 26 of the tip portion 14. Impingement of particles 48 closer to the coil 34 results in more effective prevention of ice build-up by the coil 34.

Figure 4:
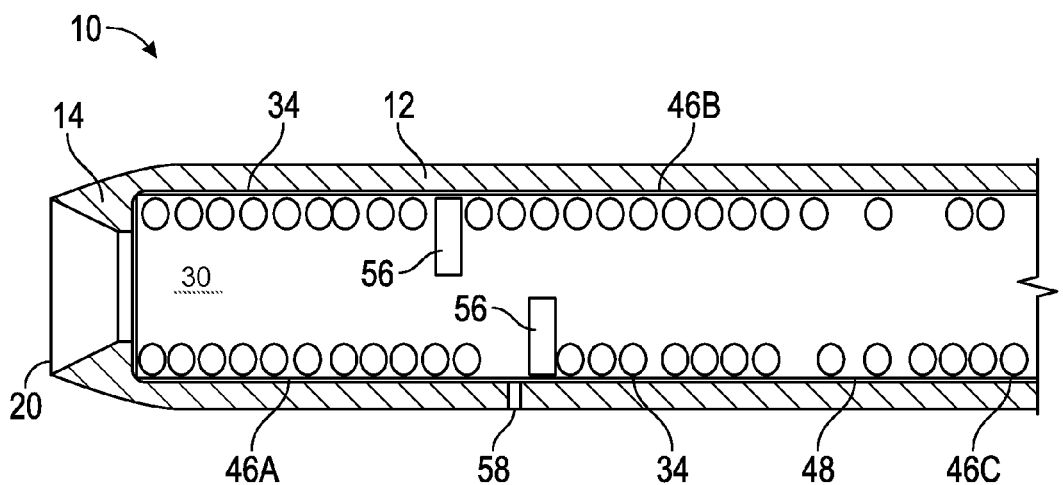
FIG. 4 is a cross-sectional view of another embodiment of a pitot tube.

Referring now to FIG. 4, the coil 34 includes a plurality of wraps 46 arranged along the tube axis 16. The wraps 46 generally decrease in watt density, and heating performance with distance from the inlet opening 20, with the forward-most wrap 46A having the greatest watt density, and successive wraps 46B and 46C having decreased watt density. One or more bulkheads 56 are located in the interior 30 to block, or partially block, pathways for ingested particles 48, such as ice crystals, to travel down the pitot tube 10. In a typical pitot tube 10, the bulkheads 56 are located far down the pitot tube 10, for example, between wraps 46B and 46C. In the embodiment of FIG. 4, however, the bulkheads 56 are located as close to the inlet opening 20 as possible, between wraps 46A and 46B. This prevents ice crystals from traveling down the pitot tube 10 to portions of the pitot tube 10 where the watt density of the wraps 46 is decreased from optimal. The embodiment of FIG. 4 takes advantage of the relatively high watt density of the forward-most wrap 46A to quickly melt any ingested ice crystals. Thus performance of the coil 34 in preventing ice crystal accumulation is improved while not increasing an amount of electrical power directed to the coil 34.

Once melted, the resulting water from the ice crystals is drained from the pitot tube 10 via one or more drain openings 58. In some embodiments, the drain openings 58 are located forward of at least one bulkhead 56 of the plurality of bulkheads 56. As shown in FIG. 4, in some embodiments, the drain opening 58 location is between wraps 46A and 46B. By melting ice crystals and draining the resulting water from the pitot tube 10 at locations forward of wrap 46B, watt density of wraps 46B and 46C, and further successive wraps, can be reduced, and the amount of electrical power supplied to the coil 34 can be reduced. In some embodiments, the successive wraps 46B or 46C downstream of the bulkheads 56 may be eliminated entirely.

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the disclosure is provided in detail in connection with only a limited number of embodiments, it should be readily understood that the disclosure is not limited to such disclosed embodiments. Rather, the disclosure can be modified to incorporate any number of variations, alterations, substitutions or equivalent arrangements not heretofore described, but which are commensurate with the spirit and scope of the disclosure. Additionally, while various embodiments of the disclosure have been described, it is to be understood that the exemplary embodiment(s) may include only some of the described exemplary aspects. Accordingly, the disclosure is not to be seen as limited by the foregoing description, but is only limited by the scope of the appended claims.

The invention claimed is:

1. A method of forming a pitot tube comprising:
    forming a substantially cylindrical body portion including an outer surface, a tip portion having an inlet opening, and an interior defining a flow passage;
    radially tapering the outer surface from the body portion toward the inlet opening;
    disposing at least one electrical coil that includes one or more coil wraps along the flow passage of the pitot tube;
    positioning at least one bulkhead along the flow passage to limit travel of particles ingested into the pitot tube; and
    arranging at least one of the one or more coil wraps along the flow path downstream of the at least one bulkhead.

2. The method of claim 1, wherein the radially tapered outer surface has a concave curve.

3. The method of claim 1, wherein disposing the at least one electrical coil includes arranging the one or more coil wraps to establish a variable watt density along the flow path.

4. The method of claim 1, further comprising: arranging at least one of the one or more coil wraps along the flow path between the inlet opening and the at least one bulkhead.

5. A method of forming a pitot tube comprising:
    forming a substantially cylindrical body portion including an outer surface, a tip portion having an inlet opening, and an interior defining a flow passage;
    radially tapering the outer surface from the body portion toward the inlet opening;
    disposing at least one electrical coil including one or more coil wraps along the flow passage of the pitot tube;
    positioning at least one bulkhead along the flow passage to limit travel of particles ingested into the pitot tube; and
    forming at least one drain opening in the substantially cylindrical body portion fluidically connecting the flow path and the outer surface;
    wherein positioning the at least one bulkhead along the flow passage includes positioning at least a first bulkhead along the flow passage and a second bulkhead along the flow passage downstream of the first bulkhead, the second bulkhead defining an aft most bulkhead.

6. The method of claim 5, wherein forming the at least one drain opening includes forming the at least one drain opening upstream of the at least one bulkhead.

7. The method of claim 6, wherein forming the at least one drain opening upstream of the at least one bulkhead includes positioning the at least one drain opening between one of the one or more coil wraps and the at least one bulkhead.

8. The method of claim 5, wherein positioning the at least one drain opening includes arranging the at least one drain opening upstream of the aft most builkhead.

9. The method of claim 8, wherein arranging the at least one drain opening upstream of the aft most builkhead includes arranging the at least one drain opening directly adjacent the aft most bulkhead.

10. The method of claim 8, wherein arranging the at least one drain opening upstream of the at least one bulkhead includes positioning the at least one drain opening between one of the one or more coil wraps and the aft most bulkhead.

11. The method of claim 10, wherein positioning the at least one drain opening between one of the one or more coil wraps and the aft most bulkhead includes arranging the at least one drain opening directly adjacent the aft most bulkhead.

* * * * *